(12) United States Patent
Kimura et al.

(10) Patent No.: US 7,229,119 B2
(45) Date of Patent: Jun. 12, 2007

(54) VEHICLE SEAT HAVING SUPPORTING DEVICE

(75) Inventors: Toshihiro Kimura, Toyota (JP); Noriaki Mizuno, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 11/402,138

(22) Filed: Apr. 12, 2006

(65) Prior Publication Data

US 2006/0255638 A1 Nov. 16, 2006

(30) Foreign Application Priority Data

Apr. 14, 2005 (JP) .............................. 2005-116683

(51) Int. Cl.
*A47C 7/54* (2006.01)
(52) U.S. Cl. ................................. 296/65.13; 297/183.9
(58) Field of Classification Search .................. 296/63, 296/65.01, 65.13; 297/183.1, 183.9, 411.24, 297/411.45
See application file for complete search history.

(56) References Cited

U.S. PATENT DOCUMENTS

| | | | | |
|---|---|---|---|---|
| 3,469,880 A | * | 9/1969 | Woodward | ............... 296/65.01 |
| 4,431,234 A | * | 2/1984 | Lacey | ........................ 297/484 |
| 5,435,614 A | * | 7/1995 | Nordberg | ..................... 296/64 |
| 5,536,068 A | * | 7/1996 | Valentor et al. | ....... 297/344.18 |
| 6,224,130 B1 | * | 5/2001 | Sasaki et al. | ............ 296/65.13 |
| 6,283,528 B1 | * | 9/2001 | Townsend | ................ 296/65.01 |
| 6,588,823 B1 | * | 7/2003 | Carlsson et al. | ......... 296/65.01 |
| 2003/0102700 A1 | * | 6/2003 | Lin | ......................... 297/183.9 |

FOREIGN PATENT DOCUMENTS

| | | | | |
|---|---|---|---|---|
| FR | 2603532 A1 | * | 3/1988 | ................. 296/63 |
| JP | 2002-345593 | | 12/2002 | |
| WO | WO 8807458 A1 | * | 10/1988 | ................. 16/444 |

* cited by examiner

*Primary Examiner*—D. Glenn Dayoan
*Assistant Examiner*—Paul Chenevert
(74) *Attorney, Agent, or Firm*—Buchanan, Ingersoll & Rooney PC

(57) ABSTRACT

A vehicle seat having a supporting device includes a lower rail fixed to a vehicle floor, an upper rail supported by the lower rail so as to be slidable in a front-rear direction, a lower arm fixed to the upper rail, a supporting cover provided at the side of a door so that a passenger gets in/out of the vehicle interior with putting his/her hand on the supporting cover, a bracket for supporting the supporting cover from underneath thereof, an upper surface portion formed in a plate shape at the bracket so as to extend in an approximately horizontal direction, an extending portion formed in a plate shape at the bracket extending downward from the upper surface portion and forming a vertical portion at which the bracket is fastened to the lower arm, and a through hole formed on the upper surface portion of the bracket.

20 Claims, 5 Drawing Sheets

VEHICLE SEAT HAVING SUPPORTING DEVICE

CROSS REFERENCE TO RELATED APPLICATIONS

This application is based on and claims priority under 35 U.S.C. § 119 to Japanese Patent Application 2005-116683, filed on Apr. 14, 2005, the entire content of which is incorporated herein by reference.

FIELD OF THE INVENTION

The present invention relates to a vehicle seat having a supporting device for supporting a passenger to get in/out of a vehicle. Specifically the supporting device includes a supporting cover provided at a seating surface of a seat cushion S on the side of a door that is used for getting on/off so that a passenger gets on/off with putting his/her hand on the supporting cover in order to ease the getting on/off operation.

BACKGROUND

A known vehicle seat disclosed in JP2002-345593A includes a lower rail, an upper rail and a lower arm. Specifically, the lower rail is fixed on the vehicle floor, the upper rail is supported by the lower rail so as to be slidable in a front-rear direction of the vehicle interior V, and the lower arm is fixed to the upper rail so as to support a seating surface of a seat cushion S.

Further, as shown in FIG. 6, the vehicle seat includes a supporting device for supporting a passenger to get in/out of a vehicle, in which a supporting cover 60' is provided to the vehicle seat at the seating surface 70' of the seat cushion S on the side of the door. In this configuration, a passenger gets in/out of the vehicle with putting his/her hand on the supporting cover in order to ease the getting on/off operation. The known supporting device has a structure where a part of the lower arm 30' extends along an under surface of the supporting cover so as to form a bracket portion 50' as shown in FIG. 6 in order to support the supporting cover from underneath thereof. In other words, the bracket portion supports pressure applied by the passenger who put on his/her hand on the supporting cover.

When excessive pressure applied to the supporting cover, for example, when a heavy object falls on the supporting cover, the bracket portion of the lower arm may deform or break. In such case, because the lower arm is integrally formed with bracket portion, even when only the bracket portion is broken, the entire lower arm needs to be replaced, as a result, a repairing cost becomes high.

Further, according to the known supporting device, because the lower arm is formed integrally with the bracket portion, such lower arm cannot be used for a vehicle not having the supporting cover. Thus, a cost for manufacturing the vehicle seat having a supporting device becomes high.

A need thus exists to reduce a cost and a repairing cost of a vehicle seat having a supporting device, the supporting device supporting a passenger to get in/out of a vehicle.

SUMMARY OF THE INVENTION

According to an aspect of the present invention, a vehicle seat having a supporting device includes a lower rail fixed to a vehicle floor, an upper rail supported by the lower rail so as to be slidable in a front-rear direction of a vehicle interior, a lower arm fixed to the upper rail so as to extend in a front-rear direction of the vehicle interior in order to support a seating surface of the seat cushion from underneath thereof, a supporting cover provided at the side of a door relative to the seating surface of the seat cushion so that a passenger gets in/out of the vehicle interior with putting his/her hand on the supporting cover, a bracket for supporting the supporting cover from underneath thereof, an upper surface portion formed in a plate shape at the bracket so as to extend in an approximately horizontal direction along a bottom surface of the supporting cover, an extending portion formed in a plate shape at the bracket extending downward from the upper surface portion and forming a vertical portion at which the bracket is fastened to the lower arm by means of a bolt, and a through hole formed on the upper surface portion of the bracket.

According to another aspect of the present invention, a vehicle seat having a supporting device includes a lower rail fixed to a vehicle floor, an upper rail supported by the lower rail so as to be slidable in a front-rear direction of a vehicle interior, a lower arm fixed to the upper rail so as to extend in a front-rear direction of the vehicle interior in order to support a seating surface of the seat cushion from underneath thereof, a supporting cover provided at the side of a door relative to the seating surface of the seat cushion so that a passenger gets in/out of the vehicle interior with putting his/her hand on the supporting cover, a bracket for supporting the supporting cover from underneath thereof, an upper surface portion formed at the bracket in a plate shape so as to extend in an approximately horizontal direction along a bottom surface of the supporting cover, an extending portion formed in a plate shape at the bracket extending downward from the upper surface portion in an approximately vertical direction relative to a right-left direction of the vehicle interior and forming a vertical portion at which the bracket is fastened to the lower arm by means of a bolt, a strip plate reinforcement portion formed in a plate shape at the bracket so as to extend vertically relative to both the upper surface portion and the extending portion and also formed in a strip shape so as to extend along the extending portion at a surface thereof on the side of the door and an under surface of the upper surface portion, and a notch portion formed on the strip plate reinforcement portion so as to be recessed from an edge thereof on the side of the door.

According to still another aspect of the present invention, a vehicle seat having a supporting device includes a lower rail fixed to a vehicle floor, an upper rail supported by the lower rail so as to be slidable in a front-rear direction of a vehicle interior, a lower arm fixed to the upper rail so as to extend in a front-rear direction of the vehicle interior in order to support a seating surface of the seat cushion from underneath thereof, a supporting cover provided at the side of a door relative to the seating surface of the seat cushion so that a passenger gets in/out of the vehicle interior with putting his/her hand on the supporting cover, a bracket for supporting the supporting cover from underneath thereof, an upper surface portion formed at the bracket in a plate shape so as to extend in an approximately horizontal direction along a bottom surface of the supporting cover, an extending portion formed at the bracket extending downward from the upper surface portion and forming a vertical portion at which the bracket is fastened to the lower arm by means of a bolt, a strip plate reinforcement portion formed in a plate shape at the bracket so as to extend vertically relative to both the upper surface portion and the extending portion and also formed in a strip shape so as to extend along the extending portion at a surface thereof on the side of the door and an under surface of the upper surface portion and a bead portion formed on the strip plate reinforcement portion so as to extend in a width direction thereof.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION (First Embodiment)

A first embodiment of the present invention will be explained in accordance with FIG. 1 through FIG. 4. The embodiment is applied to a front-left seat of the vehicle, and in the embodiment, directions such as a front-rear direction, a right-left direction and a vertical direction are set on the basis of the vehicle interior. Arrows illustrated in FIG. 1 through FIG. 4 in order to indicate the front-rear direction, the right-left direction and the vertical direction are set when the vehicle seat having a supporting device, which supports a passenger to get in/out of a vehicle (hereinafter referred to as a supporting device), is mounted at the vehicle interior.

Figure 1:
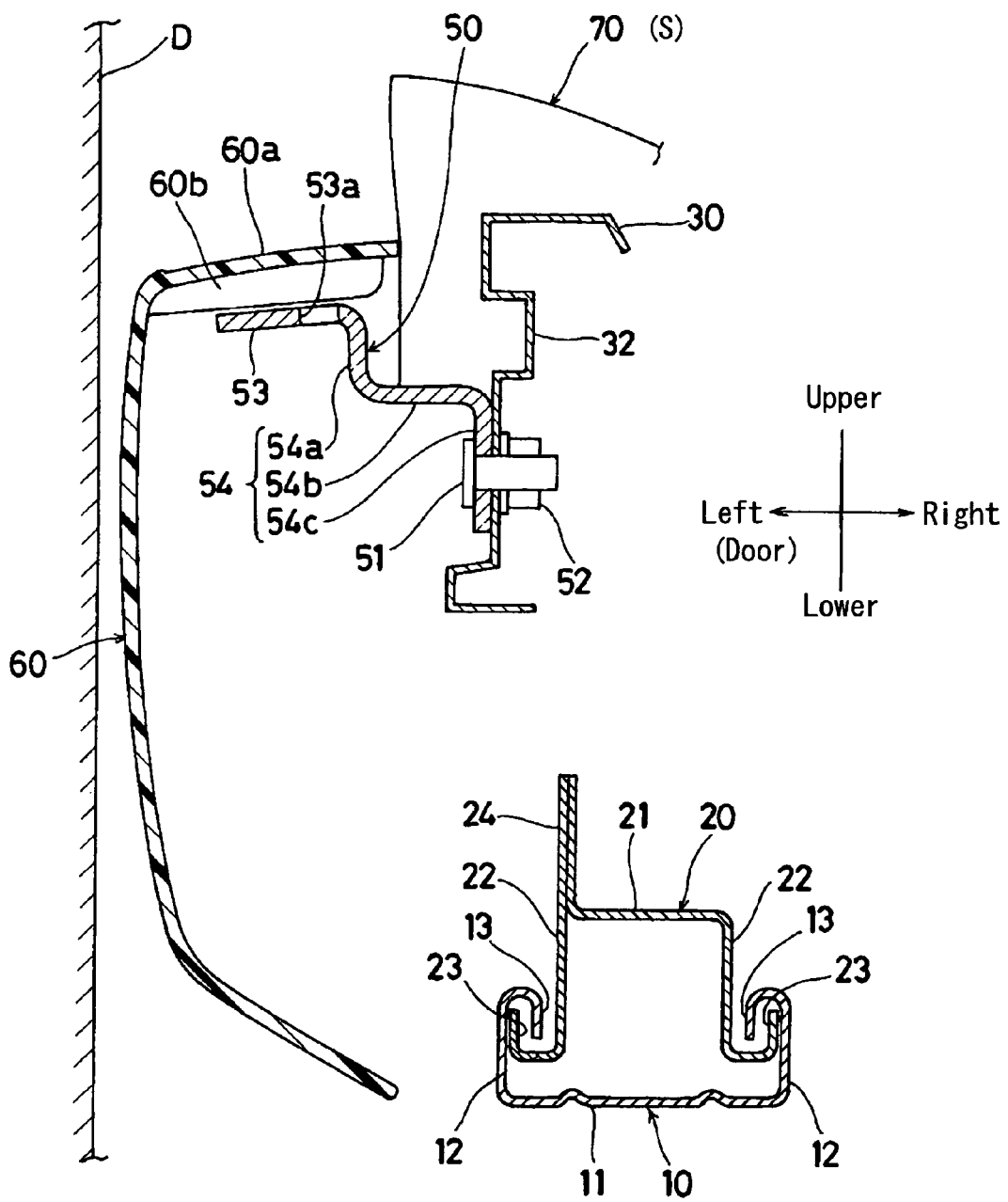
FIG. 1 illustrates a cross section indicating a part of a vehicle seat having a supporting device according to a first embodiment of the present invention.

FIG. 1 illustrates a cross section indicating a vehicle seat having a supporting device according to the embodiment. The vehicle seat having a supporting device includes, a lower rail 10, an upper rail 20, a lower arm 30, an upper arm 40, a bracket 50 and a side cover 60 having a supporting cover portion 60a (serving as a supporting cover).

The lower rail 10, the upper rail 20, the lower arm 30, the upper arm 40 and the side cover 60 are provided at each right and left side of a seating surface 70 of a seat cushion S, and the bracket 50 is provided at only left side of the seating surface 70 of the seat cushion S. Thus, because the structure on left side is same as that of the right sides other than the bracket 50, only the structure on left side is illustrated in FIG. 1 through FIG. 4 and will be explained below.

Figure 2:
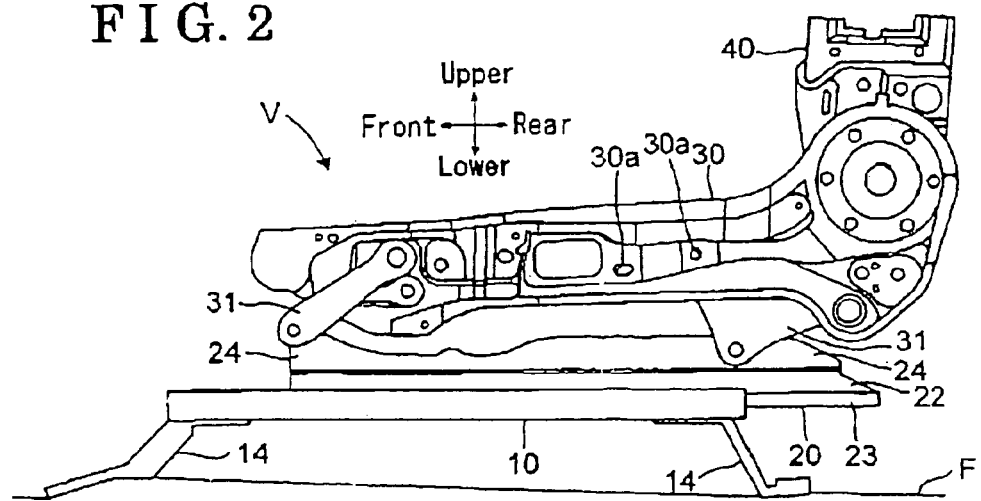
FIG. 2 illustrates a side view of the vehicle seat having a supporting device, which is shown in FIG. 1, from which the bracket and the side cover are removed.

FIG. 2 illustrates a side view of the vehicle seat having a supporting device from which the bracket 50 and the side cover 60 are removed. As shown in FIG. 1 and FIG. 2, the lower rail 10 is made of metal and formed so as to extend in a front-rear direction of the vehicle interior. Specifically, the lower rail 10 includes a pair of side wall portions 12 and a bottom portion 11 in a manner where one side wall portion 12 extends upwardly from one end of the bottom portion 11, and the other side wall portion 12 extends upwardly from the other end of the bottom portion 11, so as to have an approximate U-shape in its cross section. Each of the side wall portions 12 has a flange portion 13 at an upper portion thereof. One bracket 14 is attached to a front end of the lower rail by means of a rivet (not shown) and the other bracket 14 is attached to a rear end of the lower rail 10 by means of rivet (not shown), and the lower rail 10, and the is fixed on a vehicle floor F by means of these two brackets 14.

As shown in FIG. 1 and FIG. 2, the upper rail 20 is made of metal and formed so as to extend in the front-rear direction of the vehicle interior. Specifically, the upper rail 20 includes an upper portion 21 and a pair of side wall portions 22 in a manner where one side wall portion 22 extends downwardly from one end of the upper portion 21, and the other side wall portion 22 extends downwardly from the other end of the upper portion 21, so as to have an approximate reversed U-shape in its cross section. Each of the side wall portions 22 has a flange portion 23 at a lower portion thereof. In this configuration, the upper rail 20 is supported by the lower rail 10 so as to be slidable in a longitudinal direction thereof (a front-rear direction) in a manner where the flange portions 23 of the upper rail 20 engage with the flange portions 13 of the lower rail 10.

Figure 3:
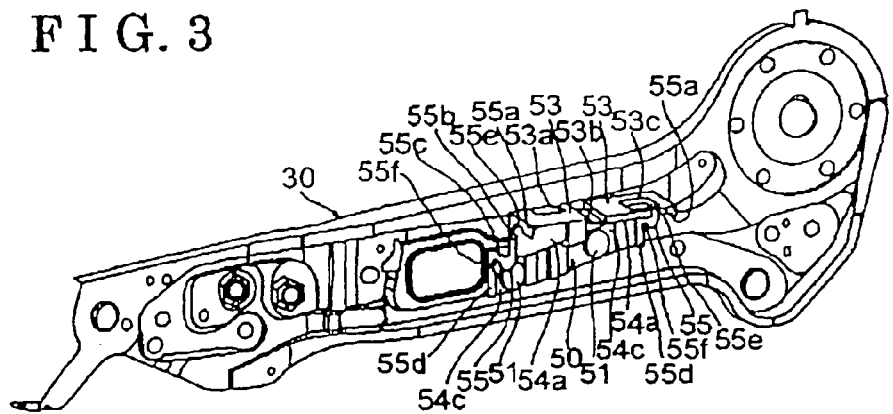
FIG. 3 illustrates an oblique view indicating a lower arm according to the first embodiment to which the bracket is attached.

FIG. 3 illustrates an oblique perspective view of the lower arm 30 to which the bracket 50 is attached. Specifically, the lower arm 30 is made of metal and includes a bracket portion 31 at which the lower arm 30 is fixed to a bracket 24 of the upper rail 20 shown in FIG. 2 by means of a fastening means such as a bolt. Thus, the lower arm 30 is supported by the upper rail 20 in order to support the seating surface 70 of the seat cushion S shown in FIG. 1 from underneath thereof.

As shown in FIG. 2, at a rear end portion of the lower arm 30, an upper arm 40 is rotatably attached so as to support the seat back (not shown) of the seat cushion S. Further, as shown in FIG. 1, the lower arm 30 includes a bead portion 32 formed by press molding so as to extend in the front-rear direction of the vehicle interior. The bead portion 32 is formed on the lower arm 30 in order to enhance rigidity thereof against flexure relative to an axial extending in a vertical direction and against flexure relative to an axial extending in a right-left direction. Further, the bead portion 32 is formed in order to enhance strength of the lower arm 30 against load applied from the seating surface 70 of the seat cushion S and load applied upon a vehicle collision.

Figure 4:
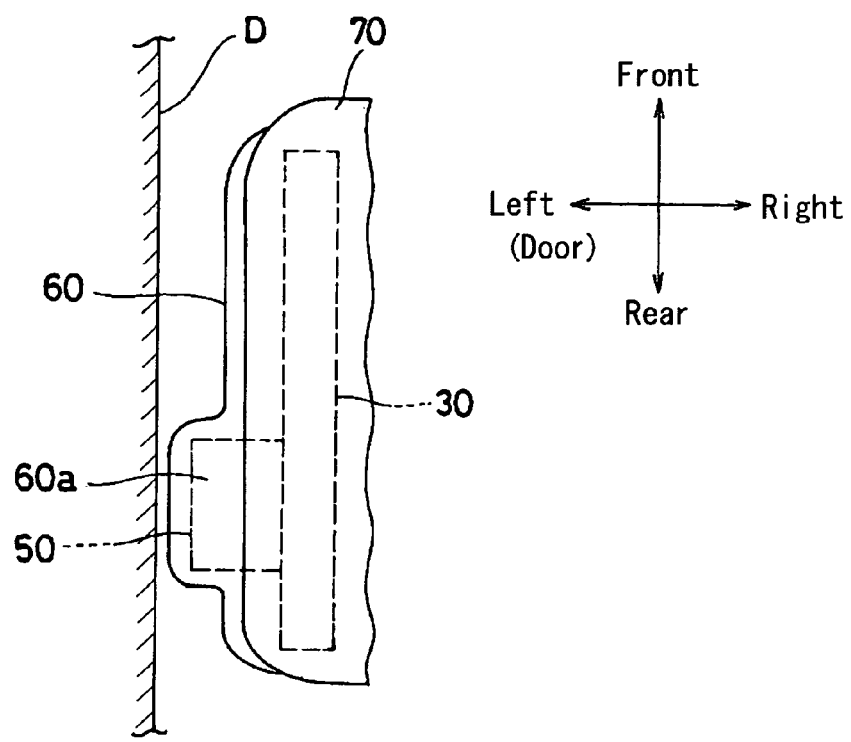
FIG. 4 illustrates a top view of the vehicle seat having a supporting device according to the first embodiment.
Figure 5:
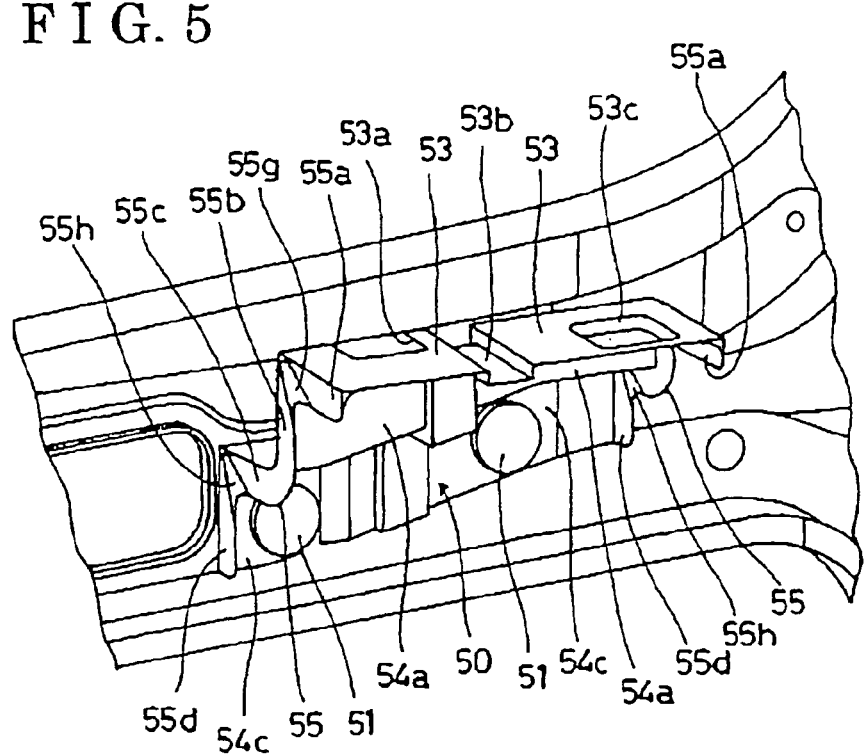
FIG. 5 illustrates a oblique view indicating a lower arm according to a second embodiment to which the bracket is attached.
Figure 6:
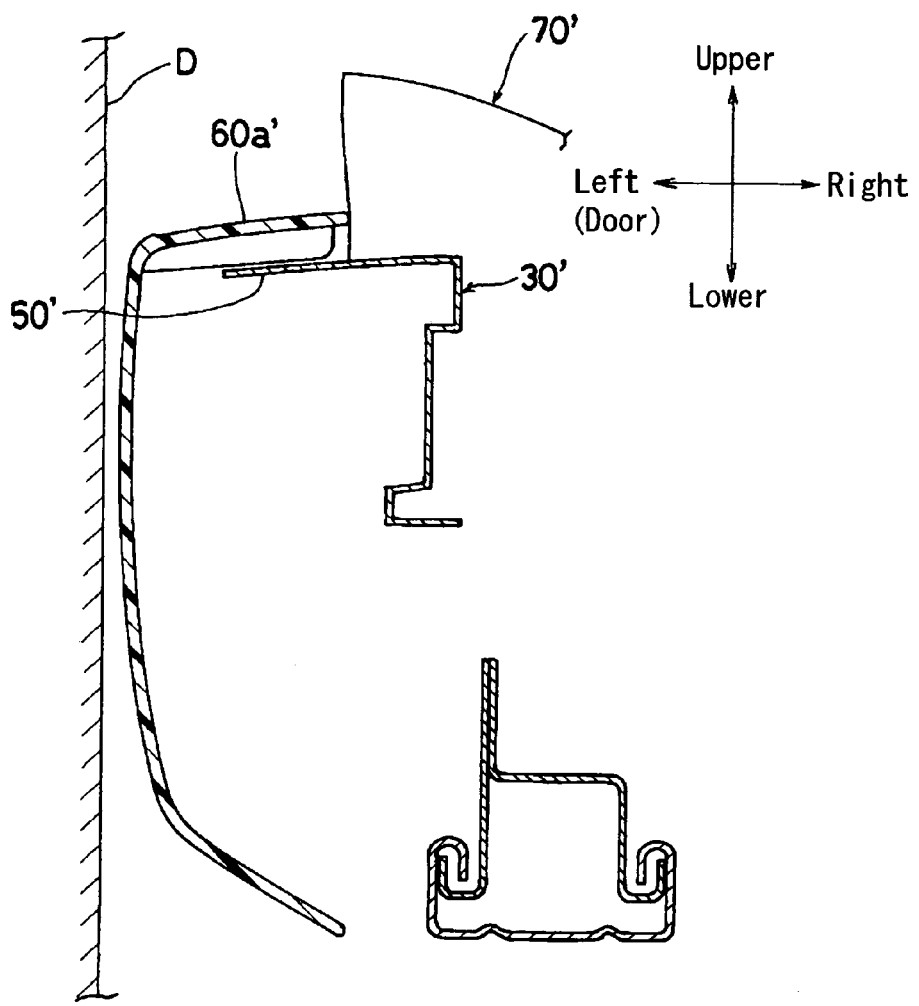
FIG. 6 illustrates a cross section indicating a vehicle seat having a supporting device of a prior art.

FIG. 4 illustrates a diagram indicating a vehicle seat having a supporting device seen from above. The side cover 60 shown in FIG. 1 and FIG. 4 is provided at left side (the side of the door D) relative to the seating surface 70 of the seat cushion S. The side cover 60 is attached to the lower arm 30 in order to cover the lower rail 10, the upper rail 20 and the lower arm 30 from the left side so as not seen from the outside.

The side cover 60 is made of resin and includes a supporting cover portion 60a that is also made of resin. Specifically, the supporting cover portion 60a (supporting cover) is formed on the upper surface of the side cover 60 so as to be integral therewith in a manner where the supporting cover portion 60a extends toward left side. The supporting cover portion 60a serving as a supporting cover is set to be approximately equal in size to an adult's palm. Thus, a passenger can get in/out of the vehicle with putting their hand on the supporting cover portion 60a in order to ease the getting on/off operation. The supporting cover portion 60a includes a rib portion 60b made of resin and formed integrally with the supporting cover portion 60a at a position facing the bracket 50 so as to extend in a downward direction.

The bracket 50 made of metal and fastened by means of the bolt 51 and the nut 52 at below of the bead portion 32 of the lower arm 30. Thus, the bracket 50 supports the supporting cover portion 60a from underneath thereof in order to support weight of the passenger who put their hand on the supporting cover portion 60a. The bolt 51 penetrates through a hole 30a shown in FIG. 2.

Further, as shown in FIG. 1, the bracket 50 includes an upper surface portion 53 and an extending portion 54. Specifically, the upper surface portion 53 is formed in a plate shape so as to extend in an approximately horizontal direction along the lower surface of the supporting cover portion 60a, and the extending portion 54 is formed in a plate shape so as to extend in an approximately vertical direction from the lower surface of the upper surface portion 53. The bracket 50 is fastened by means of the bolt 51 to the lower arm 30 at the lower end of the extending portion 54.

Because the upper surface portion 53 and the extending portion 54 are formed so as to be integral by press molding a metal plate, productivity of such bracket 50 can be more improved than the bracket that is made by welding a metal plate configuring the upper surface portion 53 and a metal plate configuring the extending portion 54 together. In this embodiment, the thickness of the bracket 50 is set to 2.0 mm, the thickness of the lower arm 30 is set to 1.2 mm and the size of the bolt 51 is set to M6.

More specifically, the extending portion 54 is formed in a stepped shape so as to include a first vertical portion 54a, a horizontal portion 54b and a second vertical portion 54c. Specifically, the first vertical portion 54a extends from the right end of the upper surface portion 53 in downward direction, the horizontal portion 54b extends from the lower end of the first vertical portion 54a in rightward direction, the second vertical portion 54c extends from the right end of the horizontal portion 54b in downward direction. The second vertical portion 54c configures a plate surface at which the bracket 50 is fastened to the lower arm 30.

Further, as shown in FIG. 3, a strip plate reinforcement portion 55 is provided at a front end and a rear end of the bracket 50. The strip plate reinforcement portion 55 is formed in a manner where it extends vertically relative to the upper surface portion 53 at underneath thereof, and the strip plate reinforcement portion 55 is formed in a manner where it also extends vertically relative to the extending portion 54 on the opposite side of the seating surface 70 of the seat cushion S. The upper surface portion 53 and the extending portion 54 may be formed by press molding so as to be integral with the strip plate reinforcement portion 55, or the strip plate reinforcement portions 55 may be welded to the bracket 50.

The shape of the strip plate reinforcement portion 55 will be explained in detail. The strip plate reinforcement portion 55 includes a first horizontal portion 55a, a first vertical portion 55b, a second horizontal portion 55c and a second vertical portion 55d. Specifically, the first horizontal portion 55a extends along the under surface of the upper surface portion 53, the first vertical portion 55b extends from the right end in facing forward condition of the first horizontal portion 55a in downward direction, the second horizontal portion 55c extends from the lower end of the first vertical portion 55b in the rightward direction in facing forward condition, and the second vertical portion 55d extends from the right end in facing forward condition of the second horizontal portion 55c in down ward direction.

The first horizontal portion 55a joins to the first vertical portion 55b at a first joint portion, and the second horizontal portion 55c joins to the second vertical portion 55d at a second joint portion. A notch portion 55e is formed at the first joint portion so as to be recessed from the edge surface of the strip plate reinforcement portion 55, and a notch portion 55f is formed at the second joint portion so as to be recessed from the edge surface of the strip plate reinforcement portion 55. Further, a through hole 53a is formed on the right end portion of the upper surface portion 53.

Further, a bead portion 53b is formed by press molding on the upper surface portion 53 so as to extend in the right-left direction thereof. Because of existence of the bead portion 53b, rigidity of the bracket 50 against flexure relative to an axial extending in the front-end direction is enhanced. Further, strength of the bracket 50 against the load applied on the bracket 50 from the upper direction (load transmitted from the supporting cover portion 60a) is also enhanced. Further, a recessed portion 53c is formed on the upper surface portion 53, and a projecting portion is formed on the supporting cover portion 60a so as to project in downward direction. The projecting portion fits in the recessed portion 53c in order to position the supporting cover portion 60a relative to the bracket 50.

Thus, according to the first embodiment, because the bracket 50 is fastened to the lower arm 30 by means of the bolt 51, the lower arm 30 having the supporting cover portion 60a can also be applied to the lower arm not having such supporting cover portion by just removing the bracket 50. Thus, the lower arm 30 can be shared between the vehicle having the supporting cover portion 60a and the vehicle not having the supporting cover portion 60a. As a result, the cost for the vehicle seat having a supporting device can be reduced.

Further, because the bracket 50 is fastened to the lower arm 30 by means of the bolt 51, when an excessive load is applied to the bracket 50, only the bracket 50 breaks, and there is no need to replace the entire lower arm 30. As a result, a repairing cost can be reduced.

According to the bracket 50 in the first embodiment, because the through hole 53a is formed on the upper surface portion 53, and the notch portion 55e and the notch portion 55f are formed on the strip plate reinforcement portion 55, the levels of the strength of the bracket 50 in the vicinity of the through hole 53a, the notch portion 55e and the notch portion 55f are reduced. In other words, when an excessive load is applied to the bracket 50, because the bracket 50 starts deforming in the vicinity of the through hole 53a, the notch portions 55e and 55f, chances that only the bracket 50 deforms, not the entire lower arm 30, can be increased. The notch portion 55e is formed at the first joint portion so as to be recessed from the edge surface of the strip plate reinforcement portion 55, and the notch portion 55f is formed at the second joint portion so as to be recessed from the edge surface of the strip plate reinforcement portion 55. Thus, chances that only the bracket 50 deforms, not the entire lower arm 30, can be increased. Further, the bracket 50 is provided so as to be flexible relative to the lower arm 30.

When the thickness of the bracket 50 is set at a smaller value, instead of providing through a hole 53a, the notch portions 55e and 55f, in order to let only the bracket 50 be broken, because the load applied to the bracket 50 concentrates on the bolt 51, chances that a part of the lower arm 30 in the vicinity of the bolt 51 deforms and breaks are increased. On the other hand, according to the first embodiment, because the bracket 50 deforms at the upper portion of the bolt 51 in order to absorb the excessive load applied to the bracket 50, chances that the excessive load transmits to the lower arm 30 by means of the bolt 51 can also be reduced.

(Second Embodiment)

In the first embodiment, the notch portion 55e and the notch portion 55f are formed on the strip plate reinforcement portion 55. In the second embodiment, a bead portion 55g and bead portion 55h are formed on the strip plate reinforcement portion 55, instead of the notch portion 55e and the notch portion 55f. The bead portion 55g and the bead portion 55h are formed so as to protrude in the front and rear directions and extend in a width direction of the strip plate reinforcement portion 55. In this configuration, the strength of the bracket 50 against the excessive load applied from above thereof can be reduced, and chances that only the bracket 50 deforms, not the entire lower arm 30, can be increased.

Because the configuration of the vehicle seat having a supporting device other than the bead portions 55g and 55h in the second embodiment is identical with that of the first embodiment, same numerals are used in both embodiments.

(Other Embodiment)

In each of the first and the second embodiments, the upper rail 20 and the lower arm 30 are provided independently, however, as the other embodiment, the upper rail 20 may be formed integrally with the lower arm 30 by press molding.

In each of the first and the second embodiments, the notch portion 55e is formed at the first joint portion, and a notch portion 55f is formed at the second joint portion, however, either one of the notch portion 55e and the notch portion 55f may be provided. Further, in each of the first embodiment and the second embodiment, the notch portions 55e and 55f, or the bead portions 55g and 55h, and the through hole 53a are provided, however, either one of them may be provided.

In each embodiment, the vehicle seat having a supporting device according to the present invention is applied to a front-left seat of the vehicle. However, it can be applied to a front-right seat, a driver's seat or a rear seat.

Because the bracket is attached to the lower arm by fastening with a bolt, the lower arm can be used for not only a vehicle having a supporting cover but also a vehicle not having a supporting cover. Thus, a cost of the vehicle seat having a supporting device for supporting a passenger to get in/out of a vehicle is reduced.

Because the bracket is attached to the lower arm by fastening with a bolt, even when an excessive load is applied and the bracket of the lower arm is broken, there is no need to replace the entire lower arm, and only the bracket needs to be replaced. Thus, a repairing cost is reduced.

Further, because the through hole is formed on the upper surface portion of the bracket, strength of the bracket is reduced in the vicinity of the through hole. Thus, when the excessive load is applied to the bracket, the bracket in the vicinity of the through hole starts deformation, in other words, chances that only the bracket deforms can be increased, as a result, a repairing cost is further reduced.

Further, because the notch portion is formed at the first joint portion so as to be recessed from the edge surface of the strip plate reinforcement portion, when an excessive load is applied to the bracket, chances that the lower arm does not break, and only the bracket breaks are further increased.

Because the bead portion extending in a width direction of the strip plate is formed on the strip plate reinforcement portion, when an excessive load is applied to the bracket, chances that the lower arm does not breaks, and only the bracket break are increased.

Because the notch portion is formed on the strip plate reinforcement portion of the bracket, the strength of the bracket in the vicinity of the through hole is reduced. In this configuration, when an excessive load is applied to the bracket, the bracket starts bending near the through hole. Thus, chances that the lower arm does not break and only the bracket breaks are increased, as a result, a repairing cost is further reduced.

Because the bead portion is formed on the strip plate reinforcement portion of the bracket, the strength of the bracket in the vicinity of the through hole is reduced. In this configuration, when an excessive load is applied to the bracket, the bracket start bending near the through hole. Thus, chances that the lower arm does not break, and only the bracket breaks are increased, as a result, a repairing cost is further reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A vehicle seat having a supporting device comprising:
a lower rail fixed to a vehicle floor;
an upper rail supported by the lower rail so as to be slidable in a front-rear direction of a vehicle interior;
a lower arm supported on the upper rail so as to extend in a front-rear direction of the vehicle interior in order to support a seating surface of the seat cushion from underneath thereof;
a supporting cover provided at the side of a door relative to the seating surface of the seat cushion so that a passenger is able to get into and out of the vehicle interior by pressing on the supporting cover;
a bracket for supporting the supporting cover from underneath thereof;
a plate shaped upper surface portion of the bracket extending in an approximately horizontal direction along a bottom surface of the supporting cover;
a plate-shaped extending portion of the bracket extending downward from the upper surface portion and forming a vertical portion at which the bracket is fastened to the lower arm by means of a bolt; and
a through hole formed on the upper surface portion of the bracket.

2. The vehicle seat having a supporting device according to claim 1, wherein the supporting cover is positioned at an upper surface portion of a side cover that is attached to the lower rail on the side of the door.

3. The vehicle seat having a supporting device according to claim 1, wherein the supporting cover is sized to be approximately equal in size to a palm of an adult.

4. The vehicle seat having a supporting device according to claim 1, wherein a rib portion is formed at the supporting cover on the side of the bracket so as to engage with the bracket.

5. The vehicle seat having a supporting device according to claim 1, wherein the bracket has a characteristic of being flexible relative to the lower arm.

6. The vehicle seat having a supporting device according to claim 1, wherein the extending portion is formed in a stepped shape in a manner where it includes a first vertical portion extending from the upper surface portion in downward direction, a horizontal portion extending from the first vertical portion in a horizontal direction and a second vertical portion extending from the horizontal portion in downward direction.

7. The vehicle seat having a supporting device according to claim 1, wherein the extending portion is formed in a plate shape so as to extend in an approximate vertical direction relative to the right-left direction of the vehicle interior, the bracket includes a strip plate reinforcement portion formed in a plate shape so as to extend vertically relative to both the upper surface portion and the extending portion and also formed in a strip shape so as to extend along the extending portion at a surface thereof on the side of the door and an under surface of the upper surface portion, and a notch portion is formed on the strip plate reinforcement portion so as to be recessed from an edge thereof on the side of the door.

8. The vehicle seat having a supporting device according to claim 7, wherein the supporting cover is positioned at an upper surface portion of a side cover that is attached to the lower rail on the side of the door.

9. The vehicle seat having a supporting device according to claim 7, wherein the supporting cover is sized to be approximately equal in size to a palm of an adult.

10. The vehicle seat having a supporting device according to claim 7, wherein a rib portion is formed at the supporting cover on the side of the bracket so as to engage with the bracket.

11. The vehicle seat having a supporting device according to claim 7, wherein the bracket has a characteristic of being flexible relative to the lower arm.

12. The vehicle seat having a supporting device according to claim 7, wherein the extending portion is formed in a stepped shape in a manner where it includes a first vertical portion extending from the upper surface portion in downward direction, a horizontal portion extending from the first vertical portion in a horizontal direction and a second vertical portion extending from the horizontal portion in downward direction.

13. The vehicle seat having a supporting device according to claim 1, wherein the extending portion is formed in a plate shape so as to extend in an approximate vertical direction relative to the right-left direction of the vehicle interior, the bracket includes a strip plate reinforcement portion formed in a plate shape so as to extend vertically relative to both the upper surface portion and the extending portion and also formed in a strip shape so as to extend along the extending portion at a surface thereof on the side of the door and an under surface of the upper surface portion, and a bead portion is formed on the strip plate reinforcement portion so as to extend in a width direction thereof.

14. The vehicle seat having a supporting device according to claim 13, wherein the supporting cover is positioned at an upper surface portion of a side cover that is attached to the lower rail on the side of the door.

15. The vehicle seat having a supporting device according to claim 13, wherein the supporting cover is seized to be approximately equal in size to a palm of an adult.

16. The vehicle seat having a supporting device according to claim 13, wherein a rib portion is formed at the supporting cover on the side of the bracket so as to engage with the bracket.

17. The vehicle seat having a supporting device according to claim 13, wherein the bracket has a characteristic of being flexible relative to the lower arm.

18. The vehicle seat having a supporting device according to claim 13, wherein the extending portion is formed in a stepped shape in a manner where it includes a first vertical portion extending from the upper surface portion in downward direction, a horizontal portion extending from the first vertical portion in a horizontal direction and a second vertical portion extending from the horizontal portion in downward direction.

19. A vehicle seat having a supporting device comprising:
a lower rail fixed to a vehicle floor;
an upper rail supported by the lower rail so as to be slidable in a front-rear direction of a vehicle interior;
a lower arm supported on the upper rail so as to extend in a front-rear direction of the vehicle interior in order to support a seating surface of the seat cushion from underneath thereof;
a supporting cover provided at the side of a door relative to the seating surface of the seat cushion so that a passenger is able to get into and out of the vehicle interior by pressing on the supporting cover;
a bracket for supporting the supporting cover from underneath thereof;
a plate-shaped upper surface portion of the bracket extending in an approximately horizontal direction along a bottom surface of the supporting cover;
a plate-shaped extending portion of the bracket extending downward from the upper surface portion in an approximately vertical direction relative to a right-left direction of the vehicle interior and forming a vertical portion at which the bracket is fastened to the lower arm by means of a bolt;
a strip plate reinforcement portion formed in a plate shape at the bracket so as to extend vertically relative to both the upper surface portion and the extending portion and also formed in a strip shape so as to extend along the extending portion at a surface thereof on the side of the door and an under surface of the upper surface portion; and
a notch portion formed on the strip plate reinforcement portion so as to be recessed from an edge thereof on the side of the door.

20. A vehicle seat having a supporting device comprising:
a lower rail fixed to a vehicle floor;
an upper rail supported by the lower rail so as to be slidable in a front-rear direction of a vehicle interior;
a lower arm supported on the upper rail so as to extend in a front-rear direction of the vehicle interior in order to support a seating surface of the seat cushion from underneath thereof;
a supporting cover provided at the side of a door relative to the seating surface of the seat cushion so that a passenger is able to get into and out of the vehicle interior by pressing on the supporting cover;
a bracket for supporting the supporting cover from underneath thereof;
a plate-shaped upper surface portion of the bracket extending in an approximately horizontal direction along a bottom surface of the supporting cover;
a plate-shaped extending portion of the bracket extending downward from the upper surface portion and forming a vertical portion at which the bracket is fastened to the lower arm by means of a bolt;
a strip plate reinforcement portion formed in a plate shape at the bracket so as to extend vertically relative to both the upper surface portion and the extending portion and also formed in a strip shape so as to extend along the extending portion at a surface thereof on the side of the door and an under surface of the upper surface portion; and
a bead portion formed on the strip plate reinforcement portion so as to extend in a width direction thereof.

* * * * *